US011157571B2

(12) United States Patent
Cardinal et al.

(10) Patent No.: US 11,157,571 B2
(45) Date of Patent: Oct. 26, 2021

(54) EXTERNAL NETWORK SYSTEM FOR EXTRACTING EXTERNAL WEBSITE DATA USING GENERATED POLYMORPHIC DATA

(71) Applicant: BANK OF AMERICA CORPORATION, Charlotte, NC (US)

(72) Inventors: Donald Joseph Cardinal, Celina, TX (US); Shane Edward Asher, San Antonio, TX (US); Christopher Daniel Birch, Dayton, OH (US); Corey Scott Gillespie, Charlotte, NC (US); Travis John Hicks, Cedar Park, TX (US); Guy Vernon Pearson, Jr., Columbia, MD (US); Todd Anthony Smialek, Fort Mill, SC (US); Shannon Sabina Willis, Pineville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 242 days.

(21) Appl. No.: 16/033,781

(22) Filed: Jul. 12, 2018

(65) Prior Publication Data

US 2020/0019645 A1 Jan. 16, 2020

(51) Int. Cl.
G06F 16/951 (2019.01)
H04L 29/08 (2006.01)
H04L 29/06 (2006.01)
G06F 16/29 (2019.01)

(52) U.S. Cl.
CPC ............ *G06F 16/951* (2019.01); *G06F 16/29* (2019.01); *H04L 67/02* (2013.01); *H04L 67/04* (2013.01); *H04L 67/20* (2013.01); *H04L 63/123* (2013.01)

(58) Field of Classification Search
CPC ....... G04L 67/306; H04L 69/22; H04L 67/20; G06F 16/972; G06F 21/62; G06F 21/00
See application file for complete search history.

(56) References Cited

U.S. PATENT DOCUMENTS

| 8,079,030 | B1 | 12/2011 | Satish et al. |
| 8,205,258 | B1 | 6/2012 | Chang et al. |
| 8,250,631 | B2 | 8/2012 | Iyengar et al. |
| 8,739,281 | B2 | 5/2014 | Wang et al. |
| 8,838,570 | B1 | 9/2014 | English |
| 8,856,924 | B2 | 10/2014 | Holloway et al. |
| 8,984,630 | B2 | 3/2015 | Shulman et al. |

(Continued)

*Primary Examiner* — Matthew Ell
*Assistant Examiner* — William P Bartlett
(74) *Attorney, Agent, or Firm* — Michael A. Springs; Moore & Van Allen PLLC; Nicholas C. Russell

(57) ABSTRACT

Embodiments of the present invention provide a system for extracting external website data using generated polymorphic data. The system is configured for receiving an input from at least one of a plurality of entity systems or at least one of a plurality of user computing systems, wherein the plurality of user computing systems and the plurality of entity systems are connected to a first network, wherein the input is associated with at least one third party server, generating random user information, wherein the generated random user information is dynamic, creating polymorphic user profiles based on the generated random user information, accessing the at least one third party server from a second network different from the first network using the polymorphic user profiles, and extracting data associated with the at least one third party server.

15 Claims, 5 Drawing Sheets

(56) References Cited

U.S. PATENT DOCUMENTS

| | | | |
|---|---|---|---|
| 8,996,485 B1 * | 3/2015 | Krishnamurthy | H04L 63/1483 707/705 |
| 9,294,502 B1 | 3/2016 | Benishti | |
| 9,300,683 B2 | 3/2016 | Rapaport et al. | |
| 9,455,997 B2 | 9/2016 | Shulman et al. | |
| 9,473,530 B2 | 10/2016 | Bhogavilli et al. | |
| 9,521,157 B1 | 12/2016 | Daveta et al. | |
| 9,544,329 B2 | 1/2017 | Call | |
| 9,646,095 B1 * | 5/2017 | Gottlieb | G06Q 30/02 |
| 9,661,020 B2 | 5/2017 | Holloway et al. | |
| 9,680,850 B2 | 6/2017 | Rapaport et al. | |
| 9,742,799 B2 | 8/2017 | Bhogavilli et al. | |
| 9,825,928 B2 | 11/2017 | Lelcuk et al. | |
| 2003/0208588 A1 * | 11/2003 | Segal | H04L 69/329 709/224 |
| 2004/0181683 A1 * | 9/2004 | Jia | G06F 21/6263 726/4 |
| 2007/0094500 A1 | 4/2007 | Shannon et al. | |
| 2009/0222405 A1 * | 9/2009 | Cara | H04L 12/2874 |
| 2009/0328208 A1 | 12/2009 | Peters | |
| 2011/0072262 A1 | 3/2011 | Amir et al. | |
| 2012/0066084 A1 * | 3/2012 | Sneyders | G06Q 30/0241 705/26.1 |
| 2012/0096159 A1 * | 4/2012 | Short | H04W 12/0802 709/225 |
| 2012/0304244 A1 | 11/2012 | Xie et al. | |
| 2013/0305357 A1 * | 11/2013 | Ayyagari | G06F 9/00 726/22 |
| 2014/0310811 A1 | 10/2014 | Hentunen | |
| 2014/0376403 A1 * | 12/2014 | Shao | H04W 4/60 370/254 |
| 2015/0088603 A1 * | 3/2015 | Romero | G06Q 30/0201 705/7.29 |
| 2015/0372980 A1 | 12/2015 | Eyada | |
| 2016/0127379 A1 * | 5/2016 | Nayshtut | H04L 63/205 726/1 |
| 2016/0189249 A1 * | 6/2016 | Meyer | H04L 67/26 705/14.66 |
| 2016/0359904 A1 | 12/2016 | Ben Ezra et al. | |
| 2017/0243243 A1 * | 8/2017 | Kosai | G06Q 10/067 |
| 2019/0087835 A1 * | 3/2019 | Schwed | G06Q 30/0201 |

* cited by examiner

US 11,157,571 B2

EXTERNAL NETWORK SYSTEM FOR EXTRACTING EXTERNAL WEBSITE DATA USING GENERATED POLYMORPHIC DATA

BACKGROUND

Accessing third party servers from a system within a network in an organization may have detrimental effects on all other systems connected to the network. Therefore, there exists a need for a system to validate that a third party server is legit, secure, and safe before accessing it via a network of an organization.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for providing a holistic and secure resource provisioning gateway. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention receives an input from at least one of a plurality of entity systems or at least one of a plurality of user computing systems, wherein the plurality of user computing systems and the plurality of entity systems are connected to a first network, wherein the input is associated with at least one third party server, generates random user information, wherein the generated random user information is dynamic, creates polymorphic user profiles based on the generated random user information, accesses the at least one third party server using the polymorphic user profiles, and extracts data associated with the at least one third party server.

In some embodiments, the present invention accesses the at least one third party websites via a second network different from the first network.

In some embodiments, the generated random user information comprises at least Internet Protocol (IP) address, user credentials, and location.

In some embodiments, the present invention generates the random user information by identifying a first location associated with the at least one third party server and generating the random user information comprising at least the Internet Protocol (IP) address, the user credentials, and the location based on the identified location of the at least one third party server.

In some embodiments, the location matches the first location associated with the at least one third party server.

In some embodiments, the at least one third party server is associated with a third party website and associated webpages.

In some embodiments, the system accesses the at least one third party server by generating a dynamic header associated with accessing the third party web site to mimic a mobile device and accessing a mobile version of the third party website based on the generated dynamic header.

In some embodiments, the system accesses the at least one third party server by generating a dynamic header associated with accessing the third party web site to mimic a desktop computer and accessing a desktop version of the third party website based on the generated dynamic header.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
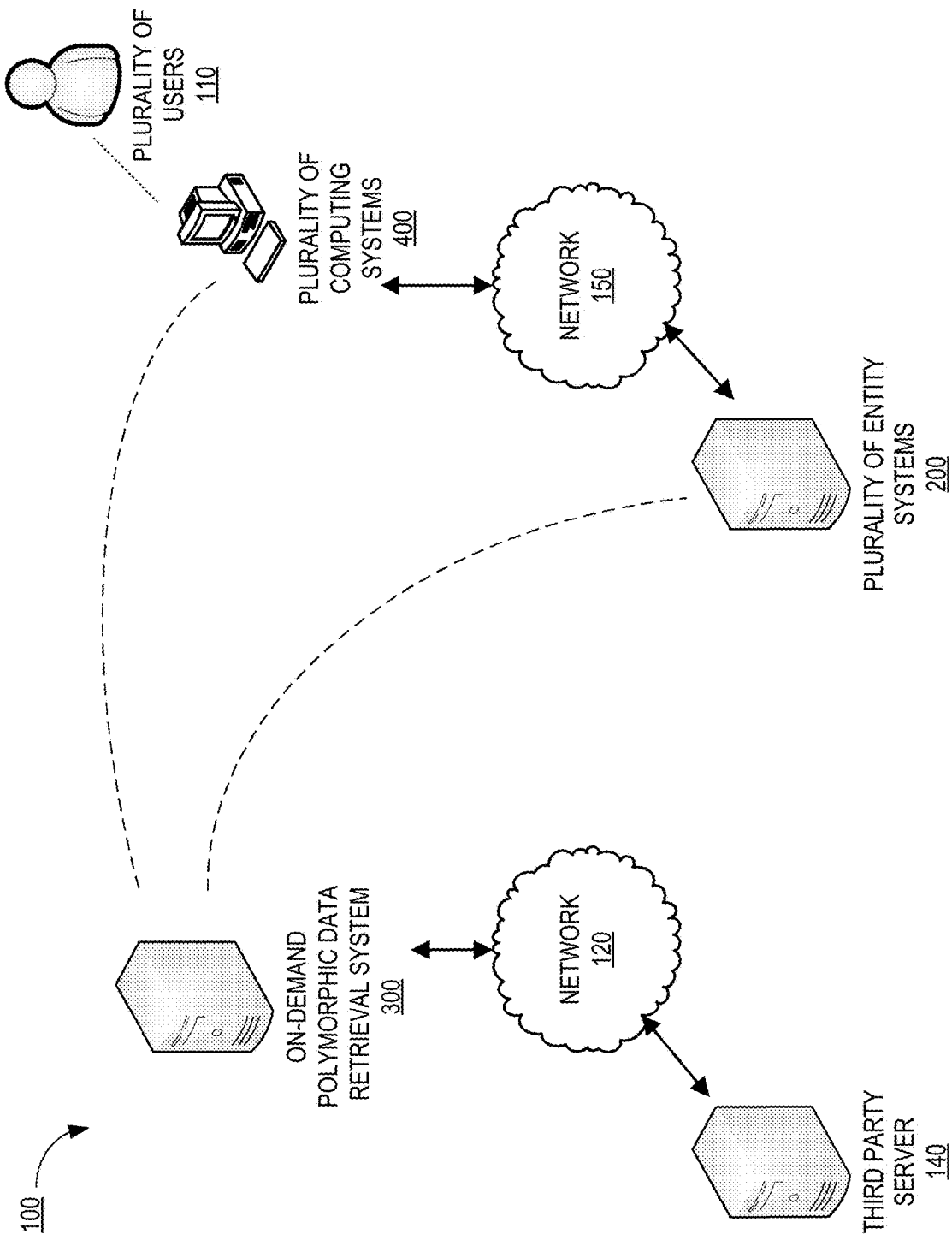
Figure 2:
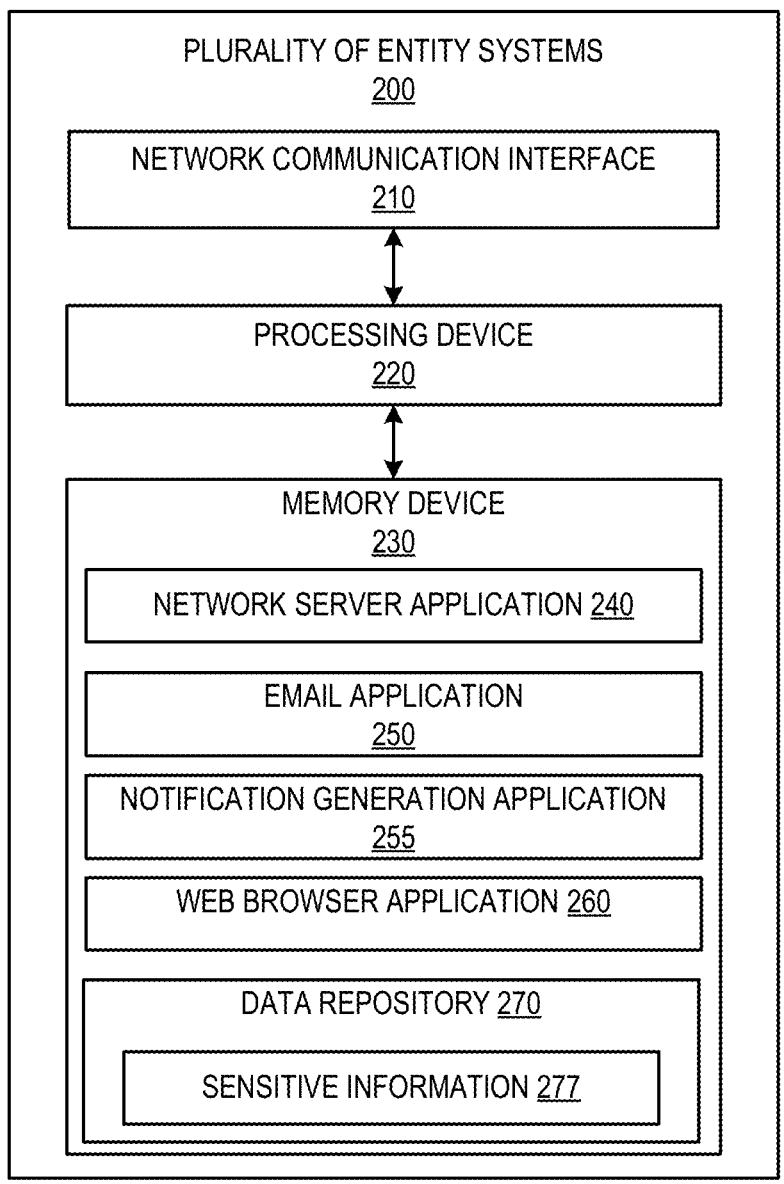
Figure 3:
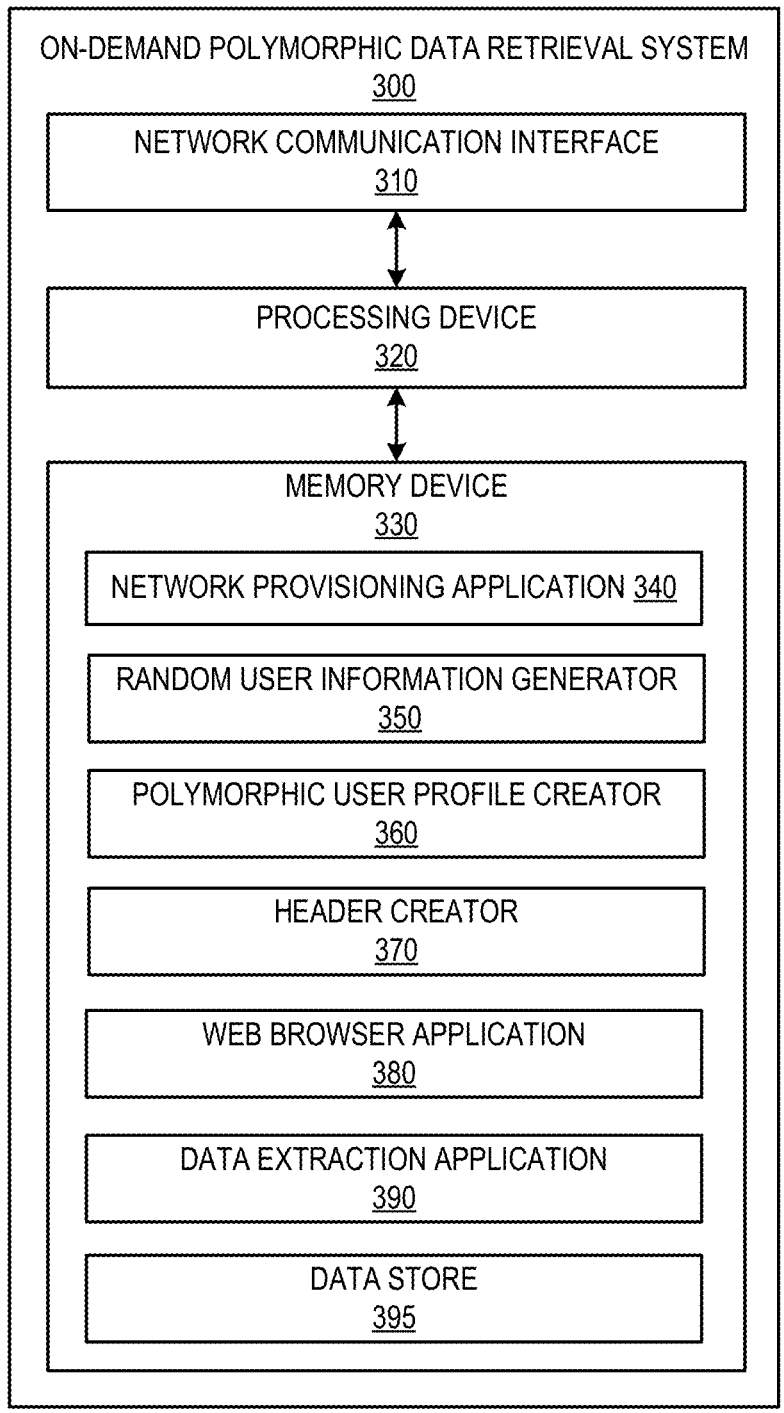
Figure 4:
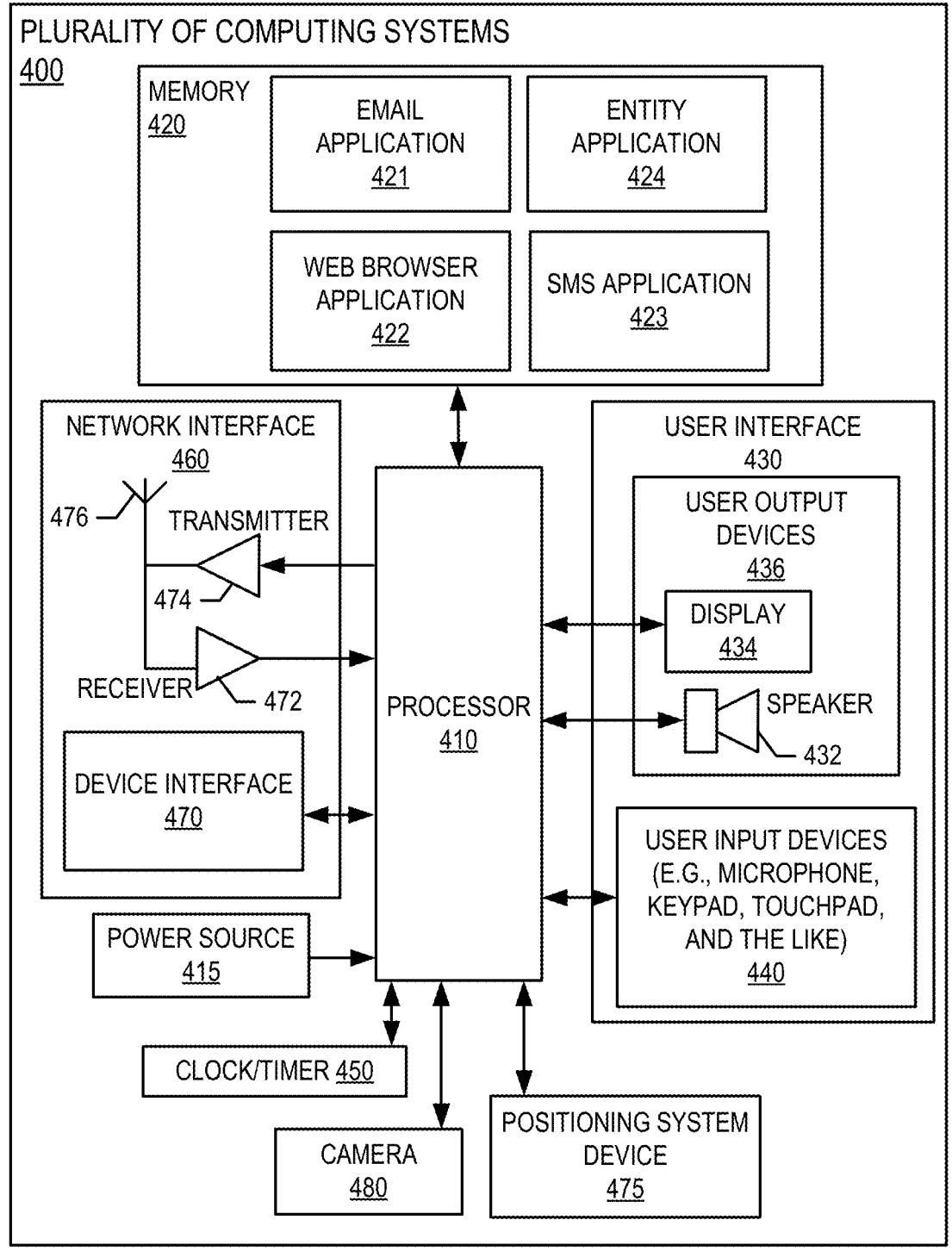
Figure 5:
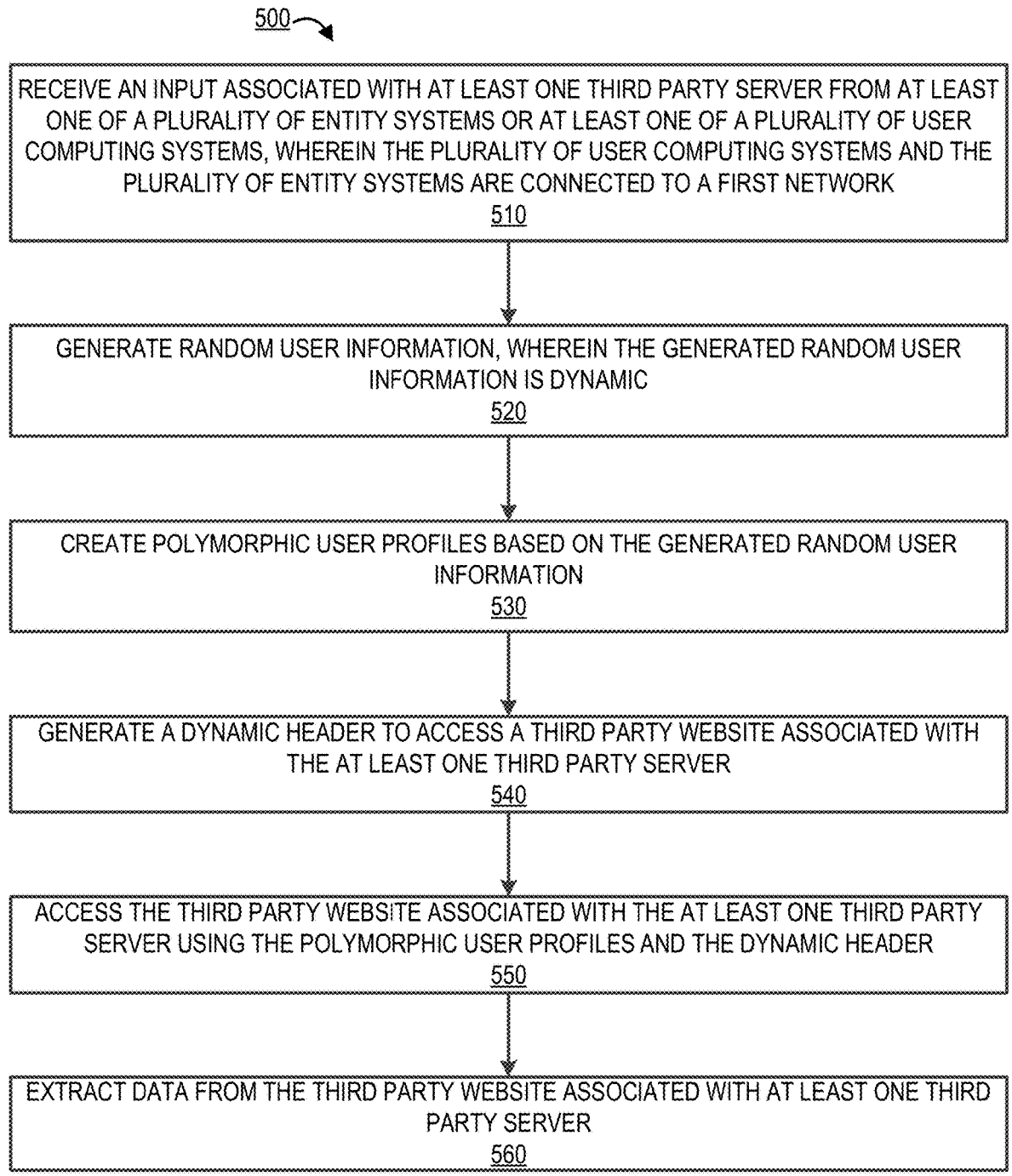

Having thus described embodiments of the invention in general terms, reference will now be made the accompanying drawings, wherein:

FIG. 1 provides a block diagram illustrating a system environment for extracting external website data using generated polymorphic data, in accordance with an embodiment of the invention;

FIG. 2 provides a block diagram illustrating a plurality of entity systems 200 of FIG. 1, in accordance with an embodiment of the invention;

FIG. 3 provides a block diagram illustrating an on-demand polymorphic data retrieval system 300 of FIG. 1, in accordance with an embodiment of the invention;

FIG. 4 provides a block diagram illustrating a plurality of computing systems 400 of FIG. 1, in accordance with an embodiment of the invention; and FIG. 5 provides a flowchart illustrating a process flow for extracting external website data using generated polymorphic data, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Typically, some third party websites or web servers may contain malicious content and upon accessing such third party websites, the malicious content may be automatically downloaded into a system accessing the third party websites, wherein the system may be connected to an entity network. The malicious content downloaded to the system may have the ability to propagate into other systems connected to the entity network, thereby causing failure of all systems within an entity and affecting day-to-day operations of the entity. Moreover, such an event may lead to exposure of sensitive information associated with the entity. Therefore, there exists a need for a system to verify that a third party website is legit, secure, and safe to access from a system connected to the entity network without affecting other systems. The system of the present invention solves the above problem by accessing all unknown websites from a network different from the entity network using dynamic and randomly generated polymorphic user profiles. The system may download data from the unknown third party websites using each of the randomly generated polymorphic user profiles and may assess the downloaded data to determine whether a third party website is safe.

FIG. 1 provides a block diagram illustrating a system environment 100 for extracting external website data using generated polymorphic data, in accordance with an embodiment of the invention. As illustrated in FIG. 1, the environment 100 includes an on-demand polymorphic data retrieval system 300, plurality of entity systems 200, a plurality of computing systems 400, and third party server 140. A plurality of users 110 may be included in the system environment 100, where the users 110 interact with the other entities of the system environment 100 via a user interface of the plurality of computing systems 400. In some embodiments, the user(s) 110 of the system environment 100 may be employees of an entity associated with the plurality of entity systems 200.

The plurality of entity systems 200 may be any systems owned or otherwise controlled by an entity to support or perform one or more process steps described herein. In some embodiments, the entity is a financial institution. The plurality of entity systems 200 may be any systems within an entity including, but not limited to, monitoring systems, anti-virus systems, data repositories, application servers, real-time communication servers, network servers, virtual server, open source server collaboration server, or the like. The plurality of computing systems 400 may include any user devices provided by the entity to its employees. The on-demand polymorphic data retrieval system 300 is a system of the present invention for performing one or more process steps described herein. In some embodiments, the on-demand polymorphic data retrieval system 300 may be an independent system. The third party server 140 may be any external system which hosts or is associated with third party websites and associated webpages.

The plurality of computing systems 400 and the plurality of entity systems 400 may be connected to a network 150, where the network 150 is associated with and/or provided by the entity. Typically, the plurality of computing systems 400 and the plurality of entity systems 400 may use the network 150 to communicate with each other and to perform operations associated with the entity. The on-demand polymorphic data retrieval system 300 may be connected to a network 120 different from the network 150 and may use the network 120 to access the third party server 140. In some embodiments, the network 120 and the network 150 may be two independent and isolated networks. The network 120 and network 150 may include a local area network (LAN), a wide area network (WAN), and/or a global area network (GAN). The network 150 and the network 120 may provide for wireline, wireless, or a combination of wireline and wireless communication between devices in the network. In one embodiment, the network 150 and the network 120 may include the Internet.

In some embodiments, the on-demand polymorphic data retrieval system 300 may receive data from the plurality of entity systems 200 and the plurality of computing systems 400. In other embodiments, the on-demand polymorphic data retrieval system 300 may communicate with the plurality of entity systems 200 and the plurality of computing systems 400 to extract, receive, or otherwise identify data. In some embodiments, the on-demand polymorphic data retrieval system 300 may transmit instructions or control signals to the plurality of entity systems 200 and the plurality of computing systems 400 to provide data and to display certain notifications.

The on-demand polymorphic data retrieval system 300 may be configured to receive data or instructions from the plurality of entity systems 200 and the plurality of computing systems 400 to verify that third party websites associated with the third party server 140 are safe to access. The on-demand polymorphic data retrieval system 300 upon receiving the data may access the third party server 140 using polymorphic user profiles to extract data from the third party server. The on-demand polymorphic data retrieval system 300 may comprise a network of a plurality of system servers that are configured to access the third party server 140 using multiple dynamic polymorphic user profiles simultaneously and extract data from the third party server 140.

The on-demand polymorphic data retrieval system 300 may communicate information or instructions with the plurality of entity systems 200 and the plurality of computing systems 400. For example, the data provisioning system may receive, via a graphical user interface provided by the on-demand polymorphic data retrieval system 300 on the plurality of computing systems 400 of the plurality of users 110 and the plurality of entity systems 200, website addresses associated with the third party server 140. Similarly, the system may provide notifications to the plurality of entity systems 200 and the plurality of computing systems 400 via the graphical user interface. In some embodiments, the on-demand polymorphic data retrieval system 300 may communicate with the plurality of entity systems 200 and the plurality of computing systems 400 via email. In some embodiments, the on-demand polymorphic data retrieval system 300 may communicate with the plurality of entity systems 200 and the plurality of computing systems 400 via a text message. In some embodiments, the on-demand polymorphic data retrieval system 300 may communicate with the plurality of entity systems 200 and the plurality of computing systems 400 via a plugin installed in a web browser application of the plurality of entity systems 200 and the plurality of user computing systems. In some embodiments, the on-demand polymorphic data retrieval systems 300 may communicate with the plurality of entity systems 200 and the plurality of computing systems 400 via an entity system (e.g., monitoring systems, spam detection systems, or the like) of the plurality of entity systems 200.

The plurality of computing systems 400 may be controlled by the entity of the plurality of entity systems 200, the plurality of users 110, and/or a third party that specializes in providing, hosting, managing, or otherwise controlling workstations or other computing devices that interact with systems in the system environment 100. As such, the plurality of computing systems 400 may be a computing device of the plurality of users 110 (e.g., an employee, contractor, or sub-contractor). In general, the plurality of computing systems 400 communicates with the plurality of users 110 via a user interface of the plurality of computing systems 400, and in turn is configured to communicate information or instructions with the on-demand polymorphic data retrieval system 300 and the plurality of entity systems 200. In some embodiments, the plurality of computing systems 400 may communicate directly with the on-demand polymorphic data retrieval system 300. In alternate embodiments, the system may communicate with the on-demand polymorphic data retrieval systems 300 via the plurality of entity systems 200.

FIG. 2 provides a block diagram illustrating the plurality of entity systems 200, in greater detail, in accordance with embodiments of the invention. As illustrated in FIG. 2, in one embodiment of the invention, the plurality of entity systems 200 includes one or more processing devices 220 operatively coupled to a network communication interface 210 and a memory device 230. In certain embodiments, the plurality of entity systems 200 is operated by a first entity, such as a financial institution, while in other embodiments, the plurality of entity systems 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the plurality of entity systems 200 described herein. For example, in one embodiment of the plurality of entity systems 200, the memory device 230 includes, but is not limited to, a network server application 240, an email application 250, a notification generation application 255, a web browser application 260, and data repository 270 which comprises at least sensitive information 277. The computer-executable program code of the network server application 240, the email application 250, the notification generation application 255, and the web browser application 260 may instruct the processing device 220 to perform certain logic, data-extraction, and data-storing functions of the plurality of entity systems 200 described herein, as well as communication functions of the plurality of entity systems 200.

The network server application 240, the email application 250, the notification generation application 255, and the web browser application 260 may instruct the processing device 220 may store or utilize data in the data repository 270 while communicating with the on-demand polymorphic data retrieval system 300. The notification generation application 255 may generate notifications associated with at least one third party server 140. In some embodiments, the notification generation application 255 may generate notifications based on the information received from the plurality of user computing systems 400. In some embodiments, the plurality of entity systems 200 may communicate with the on-demand polymorphic data retrieval system 300 via the email application 250. In some embodiments, the plurality of entity systems 200 may communicate with the on-demand polymorphic data retrieval system 300 via the web browser application 260. In some embodiments, the plurality of entity systems 200 may communicate with the on-demand polymorphic data retrieval system 300 via an on-demand polymorphic data retrieval application (not shown) and an associated graphical user interface provided by the on-demand polymorphic data retrieval system 300.

FIG. 3 provides a block diagram illustrating the on-demand polymorphic data retrieval system 300 in greater detail, in accordance with embodiments of the invention. As mentioned above, the on-demand polymorphic data retrieval system 300 of FIG. 1 may comprise a plurality of server systems, which may comprise a physical server, a virtual server, or any other computing device that is specifically configured to perform the processing functions described herein.

As illustrated in FIG. 3, in one embodiment of the invention, the on-demand polymorphic data retrieval system 300 includes one or more processing devices 320 operatively coupled to a network communication interface 310 and a memory device 330. In certain embodiments, the on-demand polymorphic data retrieval system 300 is operated by a first entity, such as a financial institution, while in other embodiments, the on-demand polymorphic data retrieval system 300 is operated by an entity other than a financial institution. In some embodiments, each on-demand polymorphic data retrieval system 300 is owned or operated by the entity of the plurality of entity systems 200. In some embodiments, the on-demand polymorphic data retrieval system 300 may be an independent system. The on-demand polymorphic data retrieval system 300 may perform one or more steps described in the process flow 500 of FIG. 5.

It should be understood that the memory device 330 may include one or more databases or other data structures/repositories. The memory device 330 also includes computer-executable program code that instructs the processing device 320 to operate the network communication interface 310 to perform certain communication functions of the on-demand polymorphic data retrieval system 300 described herein. For example, in one embodiment of the on-demand polymorphic data retrieval system 300, the memory device 330 includes, but is not limited to, a network server application 340, a random user information generator 350, a polymorphic user profile creator, header creator, a web browser application, and a data extraction application. In some embodiments, the memory device 330 may include data store 395 to store information accessed and received and extracted by the one demand polymorphic data retrieval system 300. The computer-executable program code of the network server application 340, the random user information generator 350, the polymorphic user profile creator 360, the header creator 370, the web browser application 380, the data extraction application 390 may instruct the processing device 320 to perform certain logic, data-processing, and data-storing functions of the on-demand polymorphic data retrieval system 300 described herein, as well as communication functions of the on-demand polymorphic data retrieval system 300.

The network server application 340, the random user information generator 350, the polymorphic user profile creator 360, the header creator 370, the web browser application 380, the data extraction application 390 are configured to invoke or use the data in the data store 395 when communicating through the network communication interface 310 with the plurality of entity systems 200, the plurality of computing systems 400, and/or the third party server 140. In some embodiments, the network server application 340, the random user information generator 350, the polymorphic user profile creator 360, the header creator 370, the web browser application 380, and the data extraction application 390 may be a part of a single application.

The network provisioning application 340 may instruct the processing device 320 to communicate with the plurality of entity systems 200, the plurality of computing systems 400, and the third party server 140 using the network communication interface 310. The random use information generator 350 may utilize the data in the data store 395 to generate dynamic polymorphic user information comprising IP addresses, locations, user credentials, and the like. In some embodiments, the system may communicate with the plurality of entity systems 200 and the plurality of computing systems 400 to extract user information associated with the plurality of users 100 and may use that information to generate dynamic user information. The polymorphic user profile creator 360 may utilize the dynamic user information generated by the random user information generator 350 to create multiple user profiles using multiple combinations of the generated user information. The header creator 370 may create a dynamic header comprising the generated user information from the multiple user profiles. The header creator 370 may also modify the appearance of the user and the user profile while accessing the third party systems via the web browser application 380. For example, the system may present that the user is accessing the third party server from a desktop. In another example, the system may present that the user is accessing the third party server from a mobile device. The data extraction application 390 may extract the data from the third party servers accessed via multiple profiles and store the data in the data store 395.

FIG. 4 provides a block diagram illustrating a plurality of computing systems 400 of FIG. 1 in more detail, in accordance with embodiments of the invention. The plurality of computing systems 400 are associated with the plurality of users 110. In one embodiment the plurality of users 110 may be an employee, contractor, or otherwise affiliated with the entity of the plurality of entity systems 200. However, it should be understood that a mobile telephone is merely illustrative of one type of plurality of computing systems 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the plurality of computing systems 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the plurality of computing systems 400. For example, the processor 410 may include a digital signal processor device, a microprocessor device, and various analog to digital converters, digital to analog converters, and/or other support circuits. Control and signal processing functions of the plurality of computing systems 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the plurality of computing systems 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the plurality of computing systems 400 may be configured to operate with one or more air interface standards, communication protocols, modulation types, and access types. By way of illustration, the plurality of computing systems 400 may be configured to operate in accordance with any of a number of first, second, third, and/or fourth-generation communication protocols and/or the like. For example, the plurality of computing systems 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The plurality of computing systems 400 may also be configured to operate in accordance with non-cellular communication mechanisms, such as via a wireless local area network (WLAN) or other communication/data networks.

As described above, the plurality of computing systems 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the plurality of computing systems 400 to receive data from a plurality of users 110, may include any of a number of devices allowing the plurality of computing systems 400 to receive data from the plurality of users 110, such as a keypad, keyboard, touch-screen, touchpad, microphone, mouse, joystick, other pointer device, button, soft key, and/or other input device(s). The user interface may also include a camera 480, such as a digital camera.

The plurality of computing systems 400 may also include a positioning system device 475 that is configured to be used by a positioning system to determine a location of the plurality of computing systems 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the plurality of computing systems 400. In other embodiments, the positioning system device 475 includes a proximity sensor or transmitter, such as an RFID tag, that can sense or be sensed by devices known to be located proximate a merchant or other location to determine that the plurality of computing systems 400 is located proximate these known devices.

The plurality of computing systems 400 further includes a power source 415, such as a battery, for powering various circuits and other devices that are used to operate the plurality of computing systems 400. Embodiments of the plurality of computing systems 400 may also include a clock or other timer 450 configured to determine and, in some cases, communicate actual or relative time to the processor 410 or one or more other devices.

The plurality of computing systems 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the plurality of computing systems 400 and/or one or more of the process/method steps described herein. For example, the memory 420 may include such applications as a conventional web browser application 422, an email application 421, an entity application 424, an SMS application 423, or the like. The email application 421, the web browser application 422, the SMS applications 423 may allow the plurality of users 110 to communicate with the plurality of entity systems 200, the on-demand polymorphic data retrieval system 300, and the third party server 140. The memory 420 of the plurality of computing systems 400 may comprising the Short Message Service (SMS) application 423 configured to send, receive, and store data, information, communications, alerts, and the like via the wireless telephone network 152. The entity application 424 allows the plurality of users 110 to interact with the plurality of entity systems 200. An on-demand data retrieval application may be present in the memory 420 of the plurality of computing systems 400 to allow direct communication with the on-demand polymorphic data retrieval communication system. In some embodiments, the on-demand data retrieval application may embedded within the email application 421, the entity application 424, the web browser application 422, and the SMS application 423.

The memory 420 can also store any of a number of pieces of information, and data, used by the plurality of computing systems 400 and the applications and devices that make up the plurality of computing systems 400 or are in communication with the plurality of computing systems 400 to implement the functions of the plurality of computing systems 400 and/or the other systems described herein.

FIG. 5 provides a flowchart illustrating a process flow 500 for extracting website data using generated polymorphic data. As shown in block 510, the system receives an input associated with at least one third party server from at least one of a plurality of entity systems or at least one of a plurality of user computing systems, wherein the plurality of user computing systems and the plurality of entity systems are connected to a first network. The plurality of entity systems may include any systems within the entity (e.g., financial institution), including, but not limited to, monitoring systems, spam detection systems, anti-virus systems, or the like. The plurality of user computer systems (e.g., desktop computers, mobile devices, or the like) may be any user devices utilized by the plurality of users (e.g., employees of the entity) associated with the entity. The system of the present invention may be connected to a second network different from the first network. The input associated with the at least one third party server may include, but is not limited to, website address of the third party website, an electronic communication including, but not limited to, an email or a text message received from an external system containing the website address, or the like. In one exemplary embodiment, a user may receive an electronic communication from an unknown external source, wherein the electronic communication comprises a web address. The user may forward or report the electronic communication to the system. In some embodiments, the user may forward or report the electronic communication to an entity system of the plurality of entity system and the entity system may submit the electronic communication to the system of the present invention. In one embodiment of the present invention, an entity systems such as a monitoring system may identify that a user is trying to access a third party server from a user computing system and may notify the system of the present invention. In such an embodiment, the entire process of detecting whether a third party website associated with the third party server is safe to access may be performed by the system instantly.

As shown in block 520, the system generates random user information, wherein the generated random user information is dynamic. The generated random user information may include, but is not limited to, user credentials including username, password, first name, last name, email address, or the like, Internet Protocol (IP) address, location, and the like. In some embodiments, the system may identify information associated with the third party server and generate user information based on the information associated with the third party server. For example, the system may identify that the third party server is located at first location, the system may then generate user information comprising a location matching the first location. In some embodiments, the system may generate random user information based on the information extracted from the plurality of entity systems, wherein the information may be associated with the plurality of users associated with the entity. For example, the system may generate an email address which has the same domain name as email addresses of the plurality of users and a username which resembles the usernames of the plurality of users. However, the generated email address may not match any of the existing email addresses associated with the plurality of users.

As shown in block 530, the system creates polymorphic user profiles based on the generated random user information. The system may use multiple combinations of the generated random user information to create polymorphic user profiles. For example, the system may create a first user profile with a first IP address, a first location, and a first user credentials, a second user profile with a second IP address, the first location, a second user credentials, or the like. The generated polymorphic user profiles may be used to access third party websites associated with the third party server.

As shown in block 540, the system may generate a dynamic header to access a third party website associated with the at least one third party server. In some embodiments, the generated dynamic header may be a Uniform Resource Locator (URL). In some embodiments, the dynamic header comprises information associated with generated polymorphic user profiles. For example, the generated dynamic header may comprise username, password, IP address, location, and the like. In some embodiments, the dynamic header further comprises a dynamic user agent. User agent may be a "string" or a "line of text" in the URL which comprises information associated with the web browser and the operating system used to access the at least one third party server. For example, the user agent may be "Mozilla Firefox browser on an iPad," "Internet Explorer browser version 11 on Windows," "Opera browser on Mac," "Opera browser on Windows," and the like. In some embodiments, the system may generate a dynamic header to mimic a desktop computer and use the dynamic header to access the desktop version of the third party website associated with the third party server. In such an embodiment, the generated dynamic header may further comprise information associated with the operating system and the web browser used to access the third party website. For example, the third party server may identify from the generated dynamic header that a user associated with a user profile is accessing the third party website from a "Mozilla Firefox" browser on Windows. In some embodiments, the system may generate a dynamic header to mimic a mobile device and may use the dynamic header to access a mobile version of the third party website. In such an embodiment, the generated dynamic header may further comprise information associated with the operating system of the mobile device and the browser As shown in block 550, the system may access the third party website associated with the at least one third party server using the polymorphic user profiles and the dynamic header. The system may use the polymorphic user profiles and the dynamic header to access the mobile version, the desktop version, or any other existing versions of the third party website. In some embodiments, the system may simultaneously access the third party website using all the polymorphic user profiles created by the system. In some embodiments, the system may create a network of plurality of system servers (e.g., virtual servers) to access the third party websites using the generated polymorphic user profiles simultaneously. In alternate embodiments, wherein the system comprises a network of plurality of system servers (e.g., physical servers), the system may transmit control signals to the network of plurality of system servers to access the third party websites using the generated polymorphic user profiles simultaneously.

As shown in block 560, the system may extract data from the third party website associated with at least one third party server. The system may extract data associated with each of the polymorphic user profiles and each of the dynamic headers used to access the third party server. For example, the system may access a third party website using a first user profile and may extract data from all existing versions of the third party website (e.g., mobile version, desktop version, or the like). The system may extract webpage data, downloadable content present in the webpages and the websites associated with the third party server, and all other accessible information associated with the webpages and the websites. In some embodiments, the system may extract scripts associated with the webpages. In some embodiments, the system may extract front end program codes from the websites and the associated webpages. In some embodiments, the system may take screenshots of each of the webpages in each of the websites.

In some embodiments, the system may analyze this extracted data to determine whether the third party websites and webpages associated with the at least one third party server are safe to access. In one exemplary embodiment, the system may transfer the extracted data to a system of an isolated network which is different from the first network and the second network and may identify any abnormal behavior presented by the system after receiving the extracted data. In an embodiment, where the system determines that the third party websites and webpages associated with the at least one third party servers are safe to access, the system may generate a notification and transmit the notification to the plurality of entity systems and the plurality of computing systems associated with the plurality of users. In some embodiments, the plurality of users may access the system of the present invention, via a first user computing system which is not connected to a network associated with the plurality of entity systems and the plurality of user computing systems, to analyze the data extracted from the third party websites and webpages associated with the at least one third party server and to determine whether the third party websites are safe to access.

In an embodiment, where the system or the user determines that the third party websites associated with at least one third party server are safe and secure, the system may add the at least one third party server to a "secure list" and store the "secure list" in a data store of the system. The system may present or transfer the "secure list" to the plurality of entity systems and the plurality of user computing systems. The plurality of entity systems such as an anti-virus system may allow the other plurality of entity systems and the plurality of user computing systems to access the third party servers and third party websites in the "secure list" from the first network (e.g., entity network).

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for extracting external website data using generated polymorphic data, the system comprising:
   at least one non-transitory storage device; and
   at least one processing device coupled to the at least one non-transitory storage device, wherein the at least one processing device is configured to:
   receive an input from at least one of a plurality of entity systems or at least one of a plurality of user computing systems, wherein the plurality of user computing systems and the plurality of entity systems are connected to a first network, wherein the input is associated with at least one unknown third party server and comprises a web address associated with the at least one unknown third party server;
   generate random user information, wherein the generated random user information is dynamic and comprises at least Internet Protocol (IP) address, user credentials, and location, wherein the generated random user information comprises one or more factors similar to real user information of users connected to the first network, wherein the generated random user information does not exactly match the real user information of the users;
   create polymorphic user profiles based on the generated random user information;
   generate a dynamic header to access the at least one unknown third party server, wherein the dynamic header comprises a Uniform Resource Locator;
   access the at least one unknown third party server using each of the polymorphic user profiles and the dynamic header via a second network, wherein the second network is different from the first network;

extract data associated with the at least one unknown third party server based on accessing the at least one unknown third party server using each of the polymorphic user profiles;

analyze the data associated with the at least one unknown third party server; and determine whether the at least one unknown third party server is safe to access based on analyzing the data associated with the at least one unknown third party server.

2. The system of claim 1, wherein the generation of the random user information comprises:

identifying a first location associated with the at least one unknown third party server; and generating the random user information comprising at least the Internet Protocol (IP) address, the user credentials, and the location based on the identified location of the at least one unknown third party server.

3. The system of claim 2, wherein the location matches the first location associated with the at least one unknown third party server.

4. The system of claim 1, wherein the at least one unknown third party server is associated with a third party website and associated webpages.

5. The system of claim 4, wherein generating the dynamic header comprises:

generating a mobile device dynamic header associated with accessing the third party website to mimic a mobile device; and accessing a mobile version of the third party website based on the generated mobile device dynamic header.

6. The system of claim 4, wherein generating the dynamic header comprises:

generating a desktop computer dynamic header associated with accessing the third party website to mimic a desktop computer; and accessing a desktop version of the third party website based on the generated desktop computer dynamic header.

7. A computer program product for extracting external website data using generated polymorphic data, the computer program product comprising a non-transitory computer-readable storage medium having computer-executable instructions for causing a computer processor to perform the steps of:

receiving an input from at least one of a plurality of entity systems or at least one of a plurality of user computing systems, wherein the plurality of user computing systems and the plurality of entity systems are connected to a first network, wherein the input is associated with at least one unknown third party server and comprises a web address associated with the at least one unknown third party server;

generating random user information, wherein the generated random user information is dynamic and comprises at least Internet Protocol (IP) address, user credentials, and location, wherein the generated random user information comprises one or more factors similar to real user information of users connected to the first network, wherein the generated random user information does not exactly match the real user information of the users;

creating polymorphic user profiles based on the generated random user information;

generating a dynamic header to access the at least one unknown third party server, wherein the dynamic header comprises a Uniform Resource Locator;

accessing the at least one unknown third party server using each of the polymorphic user profiles and the dynamic header via a second network, wherein the second network is different from the first network;

extracting data associated with the at least one unknown third party server based on accessing the at least one unknown third party server using each of the polymorphic user profiles;

analyzing the data associated with the at least one unknown third party server; and determining whether the at least one unknown third party server is safe to access based on analyzing the data associated with the at least one unknown third party server.

8. The computer program product of claim 7, wherein the computer readable instructions further cause the computer processor to perform the step of generating the random use information by:

identifying a first location associated with the at least one unknown third party server; and generating the random user information comprising at least the Internet Protocol (IP) address, the user credentials, and the location based on the identified location of the at least one unknown third party server.

9. The computer program product of claim 7, wherein the computer readable instructions further cause the computer processor to perform the step of generating the dynamic header by:

generating a mobile device dynamic header associated with accessing a third party website associated with the at least one unknown third party server to mimic a mobile device; and accessing a mobile version of the third party website based on the generated mobile device dynamic header.

10. The computer program product of claim 7, wherein the computer readable instructions further cause the computer processor to perform the step of generating the dynamic header accessing the at least one unknown third party server by:

generating a desktop computer dynamic header associated with accessing a third party website associated with the at least one unknown third party server to mimic a desktop computer; and accessing a desktop version of the third party website based on the generated desktop computer dynamic header.

11. A computerized method for extracting external website data using generated polymorphic data, the computerized method comprising:

receiving an input from at least one of a plurality of entity systems or at least one of a plurality of user computing systems, wherein the plurality of user computing systems and the plurality of entity systems are connected to a first network, wherein the input is associated with at least one unknown third party server and comprises a web address associated with the at least one unknown third party server;

generating random user information, wherein the generated random user information is dynamic and comprises at least Internet Protocol (IP) address, user credentials, and location, wherein the generated random user information comprises one or more factors similar to real user information of users connected to the first network, wherein the generated random user information does not exactly match the real user information of the users;

creating polymorphic user profiles based on the generated random user information;

generating a dynamic header to access the at least one unknown third party server, wherein the dynamic header comprises a Uniform Resource Locator;

accessing the at least one unknown third party server using each of the polymorphic user profiles and the dynamic header via a second network, wherein the second network is different from the first network;

extracting data associated with the at least one unknown third party server based on accessing the at least one unknown third party server using each of the polymorphic user profiles;

analyzing the data associated with the at least one unknown third party server; and determining whether the at least one unknown third party server is safe to access based on analyzing the data associated with the at least one unknown third party server.

12. The computerized method of claim 11, wherein the generation of the random user information comprises:

identifying a first location associated with the at least one unknown third party server; and generating the random user information comprising at least an Internet Protocol (IP) address, user credentials, and a location based on the identified location of the at least one unknown third party server.

13. The computerized method of claim 11, wherein the at least one unknown third party server is associated with a third party website and associated webpages.

14. The computerized method of claim 13, wherein generating the dynamic header comprises:

generating a mobile device dynamic header associated with accessing the third party website to mimic a mobile device; and accessing a mobile version of the third party website based on the generated mobile device dynamic header.

15. The computerized method of claim 13, wherein generating the dynamic header comprises:

generating a desktop computer dynamic header associated with accessing the third party website to mimic a desktop computer; and accessing a desktop version of the third party website based on the generated desktop computer dynamic header.

* * * * *